United States Patent [19]

Hein

[11] 4,406,786
[45] Sep. 27, 1983

[54] PRESSURE FILTERING DEVICE

[75] Inventor: Wolfgang Hein, Dassel, Fed. Rep. of Germany

[73] Assignee: Carl Schliecher & Schuell GmbH & Co., KG, Einbeck, Fed. Rep. of Germany

[21] Appl. No.: 347,223

[22] Filed: Feb. 9, 1982

[30] Foreign Application Priority Data

Mar. 12, 1981 [DE] Fed. Rep. of Germany ....... 3109472

[51] Int. Cl.³ ............................................. B01B 29/38
[52] U.S. Cl. ................................... 210/223; 210/413; 210/446; 210/450; 422/101
[58] Field of Search ............... 210/222, 223, 353, 406, 210/407, 413, 446, 450; 422/101

[56] References Cited

U.S. PATENT DOCUMENTS

| 2,323,160 | 6/1943 | Stechner et al. | 210/232 X |
| 3,763,879 | 10/1973 | Jaworek | 210/232 X |
| 3,831,759 | 8/1974 | Gelman | 210/232 |
| 4,113,627 | 9/1978 | Leason | 210/446 |
| 4,145,293 | 3/1974 | Cook | 210/456 X |
| 4,288,325 | 9/1981 | Shann | 210/456 |

Primary Examiner—John Adee
Attorney, Agent, or Firm—Jordan and Hamburg

[57] ABSTRACT

A pressure filtering device includes a cylindrical center part, an upper part, a lower part, a first connecting means for detachably connecting the upper part to the upper end of the center part with a fluid-tight connection and a second connecting means for detachably connecting the lower part to the lower end of the center part with a fluid-tight connection. An inlet is provided on the upper part, an outlet and a filter support are provided on the lower part, and a filter element is disposed on the filter support. A disc plate is formed integrally in the center part which can support a magnetic stirring means, the filter element being disposed between the filter support and the disc plate and being spaced from the disc plate so that the inlet side of the filter element does not contact the disc plate during assembly and operation of the pressure filtering apparatus, the first and second connecting means being constructed and arranged to provide for connecting of the upper part to the lower part with a fluid-tight connection, thereby providing for use of the pressure filtering apparatus with or without the center part.

3 Claims, 1 Drawing Figure

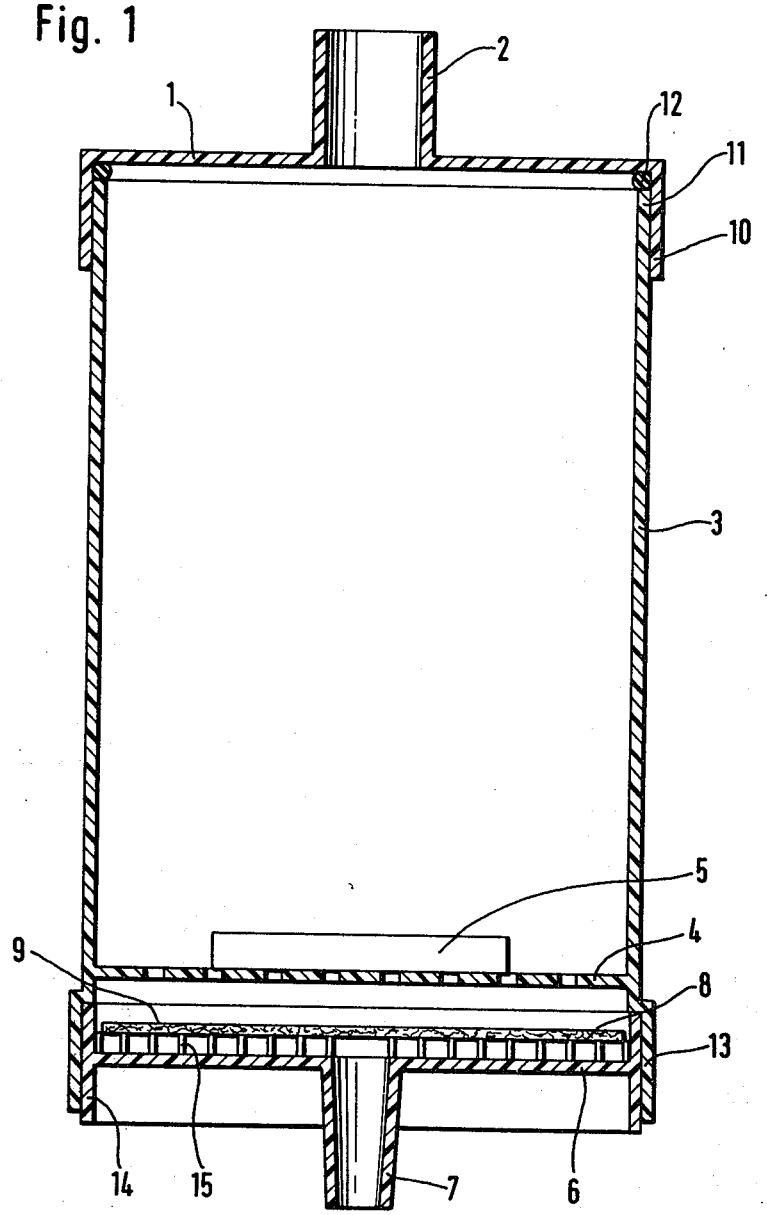

PRESSURE FILTERING DEVICE

BACKGROUND OF THE INVENTION

This invention relates to a pressure filtering device for filtering fluids.

Pressure filtration devices of this type are laboratory devices for the filtering of volumes for liquids of a magnitude of from 10 to several 100 milliliters. The infusion chamber, that is the pressure compartment of the pressure filtering device, usually has a volume that lies in a range of from approximately 10 ml to approximately 300 ml.

For a distrubance-free filtration with such devices, especially if the filter is a membrane, a pressure filtering device of this type must be provided with an agitator. A magnetic agitator having an agitating disc arranged below the cell and a magnetic agitator arranged inside the cell is almost exclusively used as magnetic agitators. Such magnetic agitators are either suspended in the infusion chamber in revolvable form or lie freely on the bottom of the infusion chamber. It has been known to arrange a this teflon-coated washer directly below the turbid side of the membrane surface in order not to damage the filter when a magnetic agitator core that lies freely on the floor is utilized. A backing plate or carrying plate for the magnetic agitating core formed as a screen plate in turn lies loosely on the membrane surface.

One disadvantage of the pressure filtering cell with a teflon-coated screen backing plate for the magnetic agitating core is that the effective filtering area is reduced through the laying out of the screen backing plate; that, in view of the unavoidable self-movement of the screen backing plate the dark-sided surface of the filter is mechanically stressed in an unfavorable way. The screen backing plate is an additional, separate component of the pressure filtering device which has to be separately cleaned, maintained, and monitored and must be available at assembly for insertion and adjustment.

One disadvantage of the suspension for pressure-filtering cells equipped with a magnetic stirring core is in the problem involving the manufacture of such suspensions. The suspensions are arranged on axial rods and slideways which, in turn, are supported on the upper side of the middle part of the pressure filtering casing. Such arrangements are not only constructionally weak in view of the long operative lever arms, but also are questionable when corroding substances are to be filtered, in view of their low resistance to corrosion. Finally, high costs are incurred with maintenance and cleaning.

In addition, pressure filtering devices for magnetic stirring, which are sometimes referred to as stirring cells, have the disadvantage that they are fully inadequate for the filtration of quantities of fluid with a volume smaller than, for instance, 3 to 5 ml. Special filtering devices of a different construction, as a rule generally flat devices, have to kept ready for the filtration of such small quantities. This requires additional investment with equipment and increases the costs of performing separation and cleaning in the laboratory.

In view of this state of the art, the present invention has an object to improve a pressure filtering device of the aforementioned type to an extent that the device for magnetic stirring action does not require any additional costly and complicated equipment or separate parts and auxiliary equipment and which can process filtration of small and minimal amounts of fluid.

The pressure filtering device of this invention is provided with a cylindrical center part with a disc or plate formed in one single piece with the cylindrical center part. The disc or plate may be a formaninous plate serving as a support plate for the magnetic agitating core, wherein the upper part and the lower part of the pressure filtering device which are connected in a pressure-tight manner on the upper side and the lower side respectively of the center part, are formed in such a way that they can also be connected directly with each other with the formation of a pressure filtering cell of flat construction without any intermediate part. The disc plate that supports the magnetic stirring core is arranged in the cylindrical middle part in such a way that when the lower part has been inserted and the filter has been placed directly above the inlet-side surface of the filter, it does not touch the same at any point. This means that it is arranged in such a way that a flat disc-shaped free space remains between the lower side of the disc that faces the filter and the inlet-side surface of the filter.

The connecting means by which the upper part can be connected to the middle part or to the lower part and the center part connected to the lower part are preferably threaded screws in combination with the usual rubber-elastic sealing elements, for example sealing rings or sealing masses that have been vulcanized on. The upper part may, for example, have the form of a lid with a drawn-down rim that reaches over the upper edge of the center part in the manner of a telescope, wherein the drawn-down closing rim has an inner thread and the upper outside border of the center part has a complementary outer thread. The lower end of the center part is provided with an inner thread into which the lower part provided with an outer thread can be threaded in a pressure-tight manner. This outer thread of the lower part may also be threaded directly onto the inner thread of the closing side of the upper part. The sealing elements that seal the upper edge of the center part to the upper part are formed in such a way that on a direct threading of the upper part and the lower part into each other, they clamp in the filter arranged in the lower part in a pressure-tight manner.

All the parts of the pressure-filtering device preferably consist of a synthetic material and have been planned for working pressures in a range of between approximately 5 and 20 bar.

The lower part of the pressure filtering device is preferably provided with a filtrate outlet fitting that protrudes axially downwardly. If the pressure filtering device is operated without a center part, the resulting flat pressure filtering device may, for example, be used in the known, usual manner directly as a spraying header with axial filtrate flow discharge. On filtration of larger volumes with the interposed center part and magnetic stirring action, the axial filtrate discharge fitting of the lower part is connected to a support in a rigid and tight manner which gives stability to the pressure filtrating device and conducts the filtrate through a channel formed in the support to a radially arranged filtrate discharge fitting. It is possible to utilize relatively short stirring intervals between the stirring place and the magnetic stirring core through the utilization of such a support, despite the axial filtrate discharge at the lower part of the pressure filtrating device.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

BRIEF DESCRIPTION OF THE DRAWING

FIG. 1 is an axial cross sectional view of a pressure filtering device according to one embodiment of the invention and shown as a schematized representation.

DESCRIPTION OF THE PREFERRED EMBODIMENTS

The pressure filtering device shown in FIG. 1 consists of an upper part 1, a center part 3, and a lower part 6.

An opening with a pipe fitting 2 is formed in the axial direction at the center of the upper part 1. Fitting 2 serves to receive the inflowing turbid material and at the same time for the receiving the impact of the pressure filtrating device. Upper part 1 is formed with an edge portion 10 extending downwardly in the manner of a rim and like a telescope extends over the upper edge 11 of the center part 3 of the pressure filtering device. Border 11 of center part 3 is provided with an outer thread (not shown in the drawing), while the rim 10 of the upper part 1 is provided with an inner thread (also not shown in the drawing). Upper part 1 is threaded onto the upper border 11 of center part 3 and is sealed off against the latter through a schematically indicated rubber-elastic sealing ring 12.

The lower end 13 of center part 3 has a diameter which is slightly larger than the diameter of the upper end 11 of center part 3 being, in substance, equal to the diameter of rim 10 of upper part 1. The center part 3 has an inner thread in this lower end section 13 which in form and characteristics corresponds to the inner thread on the rim 10 of the upper part 1. To make the illustration clearer, the inner thread formed at the lower edge 13 of the center part 3 is not shown in the drawing.

The lower part 6 has a cylindrical outer portion 14 which has an outer thread which is also not shown in the drawing, this latter thread as regards its dimensions and characteristics, corresponds to the outer thread formed on the upper end 11 of center part 3. The outer portion 14 is screwed into the inner thread by means of the outer thread on portion 14, the inner thread being provided on the lower end 13 of center part 3. To make the representation clearer, the sealing elements, which are arranged in a known and usual manner, and which seal in a pressure-tight manner the lower part 6 and filter 8 supported by the lower part 6 against the center part 3 have not been represented.

Filter 8 is supported by a filter support 15 which is formed in one piece with the lower part 14 but may also be formed separately. The filtrate discharged from the lower side of filter 8 may flow through filter support 15 to a filtrate discharge pipe fitting 7 and from the latter out from the pressure filtrating device.

Close above the inlet-side surface 9 of filter 8, which as a rule is a membrane, there is provided a foraminous disc 4 formed in one piece integrally with the center piece 3 of synthetic material. The screen disc 4 supports a magnetic stirring core 5 in freely movable form. The distance between the lower side of disc 4 and the inlet-side surface 9 of filter 8 is, in principle, kept as small as possible, while at the same time as large as possible, so that it will neither touch the inlet-side surface 9 of the filter, and also not when the filter 8 lies distorted or warped on the filter support 15, wherein any contact will be excluded even in the event that a residue layer should form on the inlet-side surface 9 of filter 8.

In order to operate the pressure filtrating device composed of the upper part 1, the center part 3, and the lower part 6 as a storage device on a stirring plate, the filtrate-discharge pipe fitting 7 of lower part 6 may be inserted in a complimentary, conically formed connecting pipe socket of a foot support or tripod stand which is not shown in the drawing. The connecting pipe fitting is connected with a radially arranged filtrate discharge pipe fitting over a passage channel.

For non-stationary operation of the pressure filtering device shown in FIG. 1, for example for operation of the device as a spraying header for filtering small volumes, for the filtration of which magnetic stirring is not necessary, the center part 3 is removed, upper part 1 with the inner thread formed in rim 10 is directly screwed onto the outer thread which is provided on the cylindrical outer portion 14 of lower part 6. The sealing of the upper part as regards filter 8 and lower part 6 is made in a known manner through the insertion of sealing elements, especially the insertion of a rubber-elastic sealing ring.

The material of the membrane for the filter 8 can be chosen from the material group such as celulose derivatives. The filtering device and its parts are for example out of plastics, polycarbonates and others. Normally the magnetic stirrer 5 is driven by a rotating magnet underneath the filtration unit. This technology is standard art for decades.

The filtering device can be used for all types of liquids that usually are to be processed in scientific and industrial laboratories.

What I claim is:

1. A pressure-filtering apparatus with magnetic stirring comprising a cylindrical center part, an upper part detachably secured to said center part with a pressure-tight securement, a lower part detachably secured to said center part with a pressure-tight securement, inlet means on said upper part, outlet means and a filter support formed on said lower part, a filter element disposed on said filter support, a disc plate formed integrally in said center part, and a magnetic stirring means disposed on said disc plate, said filter element being disposed between said filter support and said disc plate and being spaced from said disc plate so that the inlet side of said filter element does not contact said disc plate during assembly and operation of the pressure-filtering apparatus.

2. A pressure-filtering apparatus according to claim 1, wherein said disc plate is a foraminous plate.

3. A pressure-filtering apparatus according to claim 1, wherein said center part has an upper section and a lower section, said lower section having a diameter greater than said upper section, said lower part being detachably secured to the inside of said lower section of said center part, said upper part being detachably secured to the outside of said upper section of said center part.

* * * * *